US011449168B2

United States Patent
Baumbach et al.

(10) Patent No.: US 11,449,168 B2
(45) Date of Patent: Sep. 20, 2022

(54) TOUCH SURFACE SCANNING METHOD AND DEVICE

(71) Applicant: Cypress Semiconductor Corporation, San Jose, CA (US)

(72) Inventors: Jason Baumbach, Sunnyvale, CA (US); Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/653,425

(22) Filed: Oct. 15, 2019

(65) Prior Publication Data

US 2020/0042139 A1 Feb. 6, 2020

Related U.S. Application Data

(63) Continuation of application No. 12/605,683, filed on Oct. 26, 2009, now abandoned.

(60) Provisional application No. 61/108,433, filed on Oct. 24, 2008.

(51) Int. Cl.
*G06F 3/044* (2006.01)
*G06F 3/041* (2006.01)

(52) U.S. Cl.
CPC ........... *G06F 3/0416* (2013.01); *G06F 3/044* (2013.01); *G06F 2203/04104* (2013.01)

(58) Field of Classification Search
CPC ................... G06F 3/0416; G06F 3/044; G06F 2203/04104; G06F 3/0446; G06F 3/041661
See application file for complete search history.

(56) References Cited

U.S. PATENT DOCUMENTS

| | | | |
|---|---|---|---|
| 5,463,388 | A | 10/1995 | Boie et al. |
| 5,650,597 | A | 7/1997 | Redmayne |
| 5,825,352 | A | 10/1998 | Bisset et al. |
| 6,128,003 | A | 10/2000 | Smith et al. |
| 6,535,200 | B2 | 3/2003 | Philipp |
| 6,610,936 | B2 | 8/2003 | Gillespie et al. |
| 7,170,017 | B2 | 1/2007 | Chiang et al. |
| 2006/0026536 | A1 | 2/2006 | Hotelling et al. |

(Continued)

FOREIGN PATENT DOCUMENTS

WO 2009103219 A 8/2009

OTHER PUBLICATIONS

U.S. Appl. No. 12/605,683: "Touch Surface Scanning Method and Device," Jason Baumbach et al., filed Oct. 26, 2009; 42 pages.

(Continued)

*Primary Examiner* — Jeff Piziali

(57) ABSTRACT

A device acquires first sense data representing first electrical signals sensed from a first subset of a plurality of sensors of a touch surface. The device acquires second sense data representing second electrical signals sensed from a second subset of the plurality of sensors. The device detects a first set of one or more touches based on the first sense data and the second sense data. After the acquiring of the first sense data, the device acquires third sense data representing third electrical signals sensed from the first subset of the plurality of sensors; and detects a second set of one or more touches at the touch surface based on the second sense data and the third sense data.

12 Claims, 9 Drawing Sheets

(56) References Cited

U.S. PATENT DOCUMENTS

| | | | |
|---|---|---|---|
| 2006/0092143 A1 | 5/2006 | Kasai et al. | |
| 2006/0097991 A1* | 5/2006 | Hotelling | G06F 3/0443 345/173 |
| 2007/0062852 A1* | 3/2007 | Zachut | A63F 3/00643 209/683 |
| 2008/0128182 A1 | 6/2008 | Westerman et al. | |
| 2008/0158167 A1* | 7/2008 | Hotelling | G06F 1/3262 345/173 |
| 2008/0158180 A1 | 7/2008 | Krah et al. | |
| 2009/0009195 A1 | 1/2009 | Seguine | |
| 2009/0058818 A1 | 3/2009 | Chang et al. | |
| 2009/0251439 A1 | 10/2009 | Westerman et al. | |
| 2009/0273579 A1* | 11/2009 | Zachut | G06F 3/047 345/174 |
| 2010/0277426 A1 | 11/2010 | Han | |
| 2011/0141033 A2 | 11/2010 | Han | |

OTHER PUBLICATIONS

USPTO Advisory Action for U.S. Appl. No. 12/605,683 dated Jan. 18, 2013; 3 pages.

USPTO Advisory Action for U.S. Appl. No. 12/605,683 dated Apr. 2, 2018; 3 pages.

USPTO Advisory Action for U.S. Appl. No. 12/605,683 dated Sep. 16, 2016; 3 pages.

USPTO Final Rejection for U.S. Appl. No. 12/605,683 dated Jan. 24, 2018; 29 pages.

USPTO Final Rejection for U.S. Appl. No. 12/605,683 dated May 23, 2019; 12 pages.

USPTO Final Rejection for U.S. Appl. No. 12/605,683 dated Jul. 5, 2016; 29 pages.

USPTO Final Rejection for U.S. Appl. No. 12/605,683 dated Nov. 14, 2012; 30 pages.

USPTO Non-Final Rejection for U.S. Appl. No. 12/605,683 dated Jan. 15, 2016; 42 pages.

USPTO Non-Final Rejection for U.S. Appl. No. 12/605,683 dated Jun. 29, 2012; 44 pages.

USPTO Non-Final Rejection for U.S. Appl. No. 12/605,683 dated Aug. 24, 2017; 36 pages.

USPTO Non-Final Rejection for U.S. Appl. No. 12/605,683 dated Nov. 29, 2018; 12 pages.

Touchkit, Inc. TouchKit TouchScreen Controller User Manual for Windows 2000/XP Version 4.0.2, Nov. 2005, pp. 0-30, http://touchkit.com/Manuals.html; 16 pages.

\* cited by examiner

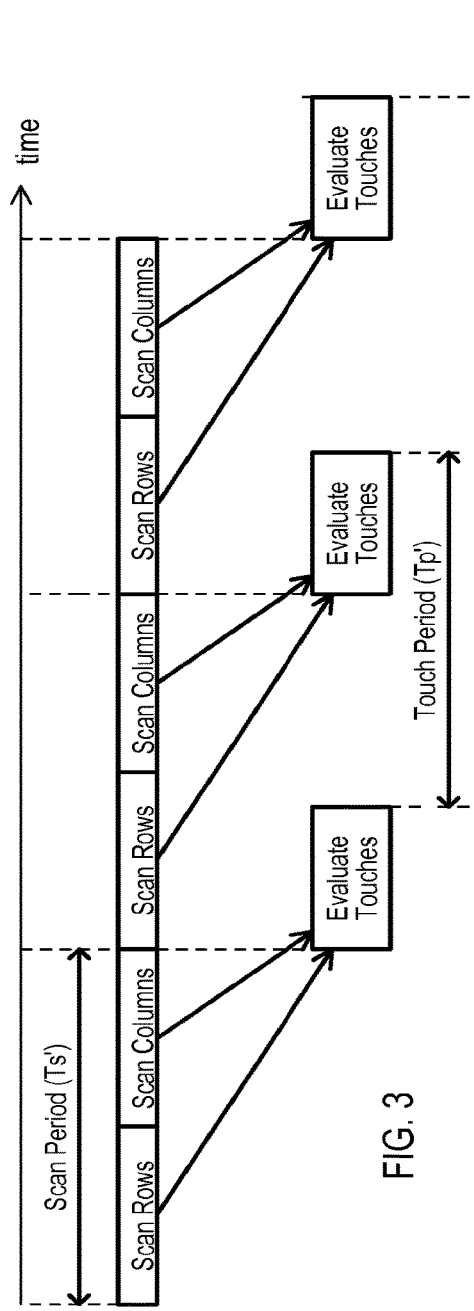
FIG. 3
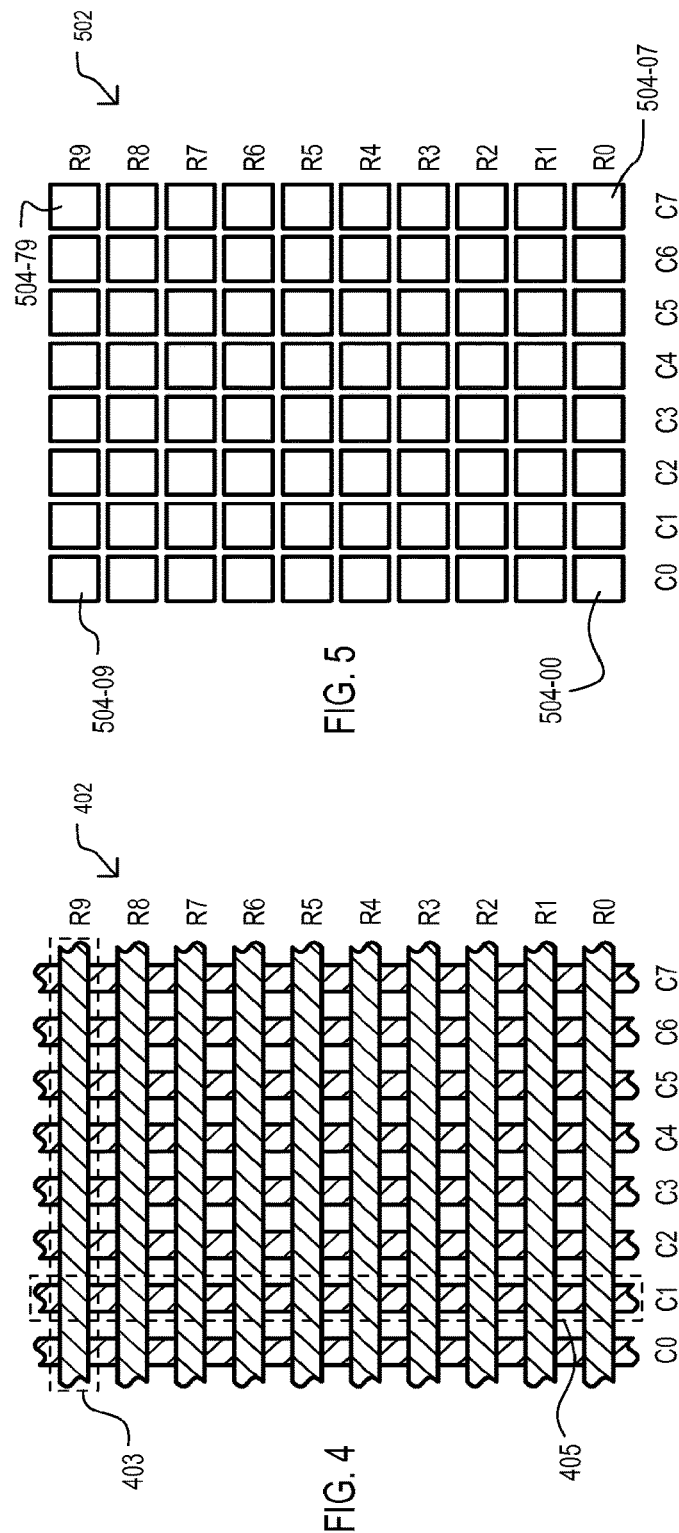
FIG. 5
FIG. 4

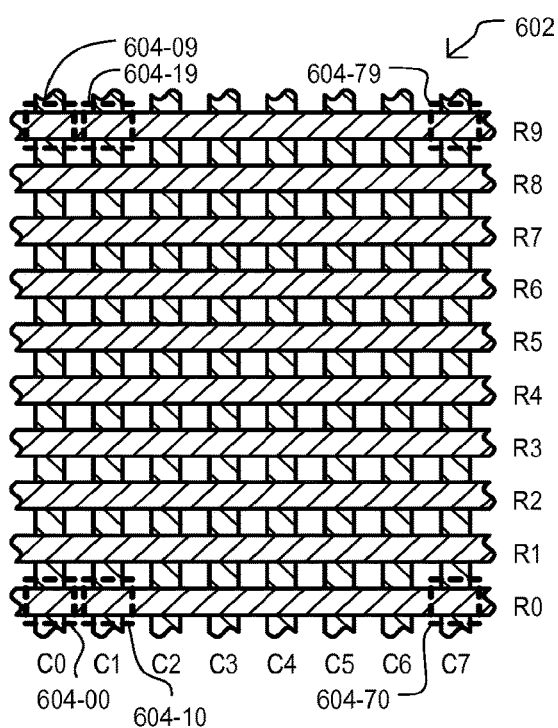
FIG. 6
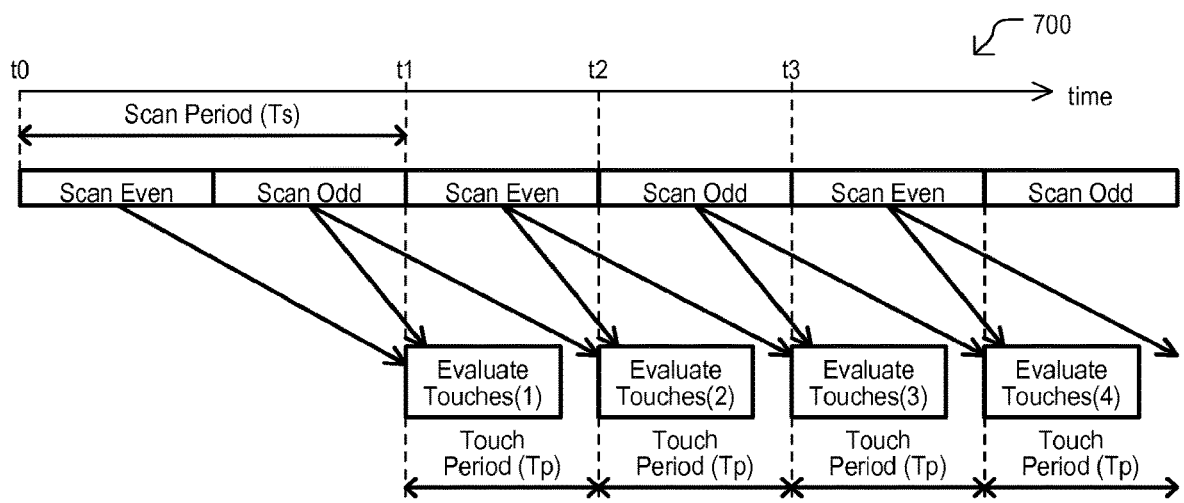
FIG. 7A
FIG. 7B

TOUCH SURFACE SCANNING METHOD AND DEVICE

The present application is a continuation application of U.S. Non-Provisional application Ser. No. 12/605,683, filed on Oct. 26, 2009, which claims priority and benefit of U.S. Provisional Application No. 61/108,433, filed on Oct. 24, 2008, all of which are incorporated by reference herein in their entirety.

TECHNICAL FIELD

The present disclosure relates to touch sensing, and more particularly to touch sensors that periodically evaluate a surface to determine if one or more touches have occurred on the surface.

BRIEF DESCRIPTION OF THE DRAWINGS

FIG. 3 is a diagram showing a sense operation according to one embodiment.

FIG. 4 is a top plan view of a touch area that may be included in embodiments.

FIG. 5 is a top plan view of another touch area that may be included in embodiments.

FIG. 6 is a top plan view of further touch area that may be included in embodiments.

FIGS. 7A and 7B show a touch area and corresponding sense operation and according to another embodiment.

DETAILED DESCRIPTION

Various embodiments will now be described that show devices and methods for sensing touches on a surface. In particular embodiments, a reporting period of touch sensing results may be decreased by sensing touches for only a portion of a touch area, and combining such sense data with previous sense data for a remaining portion of the touch area.

Figure 1:
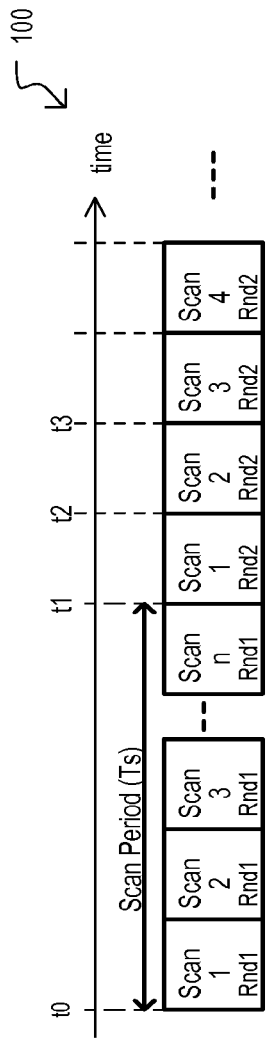
FIG. 1 is a diagram showing a sense operation according to a first embodiment.

Referring now to FIG. 1, a sensing operation according to one embodiment is shown in a diagram and designated by the general reference character 100. FIG. 1 shows actions executed by a method and/or device over time. FIG. 1 shows two different time periods: a scan period (Ts) and a touch period (Tp). A scan period (Ts) may represent a time required to provide sense data for an entire touch area. A touch period (Tp) may represent a time for reporting touch evaluation results for an entire touch area. Touch evaluation results may determine where/if touches have occurred, and may also describe the nature/characteristics of such touches.

In the particular embodiment shown, a touch area may include "n" different portions, with each portion being accessed (e.g., scanned) to acquire sense data. As shown, acquisition of new sense data for an entire touch area may occur over the scan period (Ts).

Referring still to FIG. 1, touch evaluations may occur in a "pipelined" fashion, wherein each subsequent evaluation in a sequence may be based on newly acquired sense data for a portion of a touch area. Sense data for a remaining portion of the touch area may be data retained from a previous evaluation operation.

The operation shown in FIG. 1 will now be described.

At about time t0, the acquisition of sense data for an entire touch area (i.e., all "n" portions) may start with a scan of a first portion (Scan 1). Each following portion may be scanned (i.e., Scan 2, Scan 3 . . . ) until a last portion is scanned (Scan n).

At about time t1, sense data for an entire touch area may have been acquired (portions 1 to n have been scanned). That is, a first sensing round (Rnd1) may be complete. Also at this time, the acquisition of sense data for an entire touch area may start once again (Rnd 2).

Following the acquisition of a full set of sense data at time t1, a first evaluation operation (Eval(a)) may occur. Such an evaluation may be based on sense data for all portions (1 to n) acquired in the first round (Rnd1).

At about time t2, a first evaluation operation (Eval(a)) may be complete and touch results may be provided. Also at this time, sense data for one portion (i.e., portion 1) may be acquired for second round (Rnd(2)), with remaining portions (i.e., 2 to n), yet to be completed for the second round.

Unlike approaches that acquire sense data for all portions of a touch area for each evaluation, in method 100 a second evaluation operation (Eval(b)) may occur at time t2 following the acquisition of sense data for a portion (Scan 1, Rnd2) of the touch area. Such an evaluation may be based newly acquired sense data for portion 1 (Scan 1, Rnd2) along with previously acquired sense data for the remaining portions of the scan area (Scan 2 to n, Rnd1) acquired in the first round.

At about time t3, a second evaluation operation (Eval(b)) may be complete and touch results may be provided. Also at about this time, sense data for a second portion (i.e., portion 2) may be acquired for the second round (Rnd(2)), with remaining portions (i.e., 3 to n), yet to be completed for the second round. However, at about this time, a third evaluation operation (Eval(c)) may occur, based on sense data for sections 3 to n acquired in the first round (Scan 3 to n, Rnd1), along with sense data for sections 1 and 2, acquired for the second round (Scan 1 to 2, Rnd2).

Operations may continue in the same fashion, evaluating for touches with the acquisition of sense data for each touch area portion, as opposed to the entire touch area.

A touch period (Tp) may be shorter than a scan period (Ts), resulting in a touch report rate that is faster than a full area scan rate.

It is noted that a touch area may be a contiguous area that represents all possible areas sensed for a touch, or may be one or more smaller portions of a larger touch region. Further, the number of portions (n) may be a number as small as two, or as large the total number of sense locations within a touch area. Further, sense data may sense touches by body parts (e.g., fingers, palms), or by a touching implement (e.g., a stylus, touch pen).

In this way, touch sensing operations may have a report rate (rate at which touch evaluations are provided) that is faster than a complete touch area scan rate (rate at which sense data for the entire touch area is acquired). In addition, a touch sensing operation may utilize newly acquired sense data for a portion of a touch area combined with previously acquired sense data for a remaining portion of the touch area.

Figure 2:
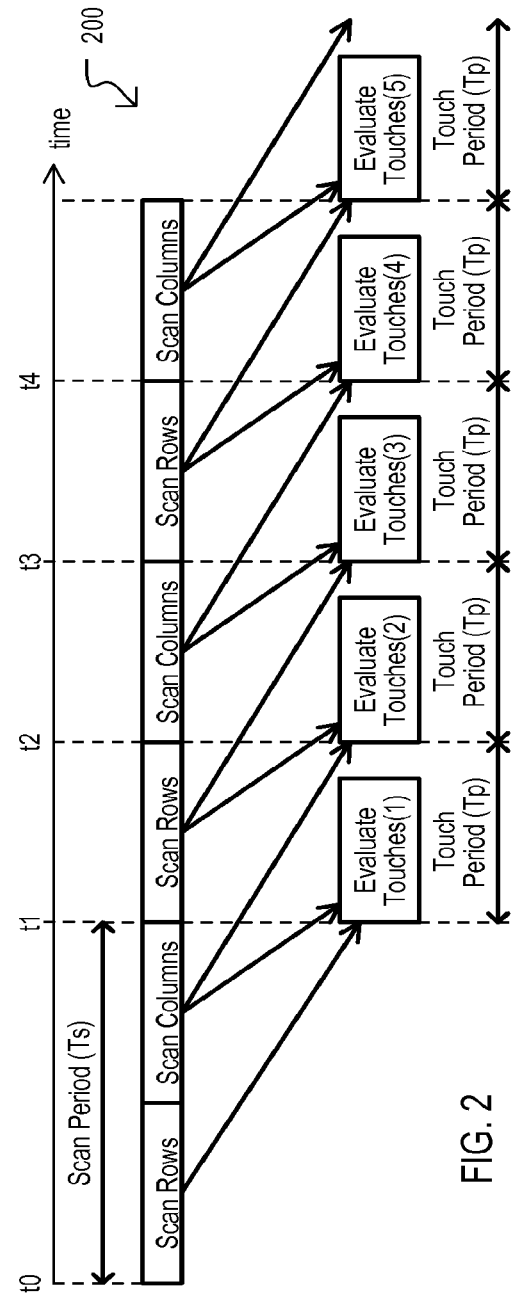
FIG. 2 is a diagram showing a sense operation according to another embodiment.

Referring to FIG. 2, another example of a sensing operation according to an embodiment is shown in a diagram and designated by the general reference character 200. FIG. 2 shows actions executed by a method and/or device over time, and may be one particular implementation of the embodiment shown in FIG. 1.

An operation 200 may alternately sense rows and columns of a touch area. Accordingly, scan data for all rows and columns may be acquired in a scan period (Ts).

In the particular embodiment of FIG. 2, at about time t0 sense data for one portion (in this particular example, rows) may be acquired, followed by sense data for a remaining portion (in this particular example, columns).

At about time t1, sense data for an entire touch area may be acquired, and a first evaluation operation may occur based on sense data for columns and rows acquired between about time t0 and t1. In addition, at about this time, a second round of sense data acquisition may begin, with rows being scanned again.

At about time t2, new sense data for rows may be acquired, and a second evaluation operation may occur based on the newly acquired row sense data, and previously acquired column sense data.

Sense operations may continue as shown in FIG. 2, evaluating for touches after each portion (rows or columns) of sense data is acquired.

FIG. 3 provides a comparison to FIG. 2. FIG. 3 shows a touch sensing operation that evaluates for touches only after all rows and columns have been sensed. Consequently, in such an approach, a touch period (Tp) may be no smaller than a scan period (Ts).

Referring to FIG. 4, one example of a touch area that may be included in an operation like that of FIG. 2 is shown in a top plan view and designated by the general reference character 402. A touch area 402 may include row sensors (some shown as R0 to R9), as well as column sensors (some shown as C0 to C7). Row sensors (R0 to R9) may be accessed in a "Scan Rows" operation, while column sensors (C0 to C7) may be accessed in a "Scan Columns" operation. One particular row scan area is shown by reference character 403, and one particular column scan area is shown by reference character 405. In a particular embodiment, a touch area 402 may be a "self-capacitance" scan array in which a capacitance of each sensor is determined to detect touches. In an alternate embodiment the Scan Rows operation may include much fewer scan areas than the number of rows present. For example, more than one row (e.g., R9 and R8) to as many as all the rows (e.g., R0 through R9) may be measured for self-capacitance at the same time using multiple instances of capacitance sensing hardware. Likewise, the Scan Columns operation may also include fewer scan areas than the number of columns present.

In this way, scan operations may include separately accessing rows and columns to provide sense data for different portions of a touch area.

While some embodiments may separately access rows and columns to derive touch sense data, other embodiments may evaluate discrete locations within a touch area smaller than an entire row or column. One particular embodiment of such a touch areas is shown in FIG. 5.

Referring to FIG. 5, another example of a touch area that may be included in embodiments, is shown in a top plan view and designated by the general reference character 502. A touch area 502 may provide sense data for particular locations (some shown as 504-00 to 504-79). In such an arrangement, discrete locations (504-00 to 504-79) may be sensed in two or more different portions, which in particular embodiments may be exclusive of one another.

Referring to FIG. 6, one particular implementation of a touch area like that of FIG. 5 is shown in a top plan view and designated by the general reference character 602. The particular embodiment of FIG. 6, like that of FIG. 4, may include sensor rows (MR0 to MR9) and sensor columns (MC0 to MC7). However, a touch area 602 may be a "mutual capacitance" scan array in which a capacitance between a row and column is measured, to thereby provide a sense reading at the intersection of such a row and column. Accordingly, sense locations (some shown as 604-00 to 604-79) may be formed at intersections of sensor rows (MR0 to MR9) and sensor columns (MC0 to MC7).

In this way, scan operations may include separately accessing discrete locations of a touch area that are smaller than an entire row or column.

Referring now to FIGS. 7A and 7B, a sensing operation according to a further embodiment is shown in the diagrams. FIG. 7A is a top plan view of a touch area which, in one example, may be one implementation of that shown in FIG. 5 or 6. FIG. 7B shows actions of the sensing operation over time, and may be one implementation of that shown in FIG. 1.

Referring to FIG. 7A, a touch area 702 may be conceptualized as including discrete sensed locations corresponding to rows (R0 to R9) and columns (C0 to C7). Such sensed locations are logically arranged into odd rows (each sensed location of an odd row shown as "O") and even rows (each sensed location of an even row shown as "E").

Referring to FIG. 7B, a sensing operation according to another embodiment is shown in a diagram and designated by the general reference character 700. A sense operation 700 may utilize a touch area 702 like that of FIG. 7A.

FIG. 7B shows actions that may be executed by a method and/or device over time, and may be one particular implementation of the embodiment shown in FIG. 1.

An operation 700 may alternately sense odd and even locations of a touch area like that of FIG. 7A. Accordingly, data for an entire touch area may be acquired in a scan period (Ts) as shown in FIG. 7b.

In the particular embodiment of FIG. 7B, at about time t0 sense data for one portion (in this particular example, even locations) may be acquired, followed by sense data for a remaining portion (in this particular example, odd locations).

At about time t1, sense data for an entire touch area may be acquired, and a first evaluation operation may occur based on sense data for odd and even locations acquired between about time t0 and t1. In addition, at about this time, a second round of sense data acquisition may begin, with even locations being scanned once again.

At about time t2, new sense data for odd locations may be acquired, and a second evaluation operation may occur based on the newly acquired even location data, and previously acquired odd location data.

Sense operations may continue as shown in FIG. 7B, evaluating for touches after each portion (even or odd locations) of sense data is acquired.

In this way, scan operations may include separately accessing discrete locations of a touch area arranged into even and odd row positions.

Figure 8A:
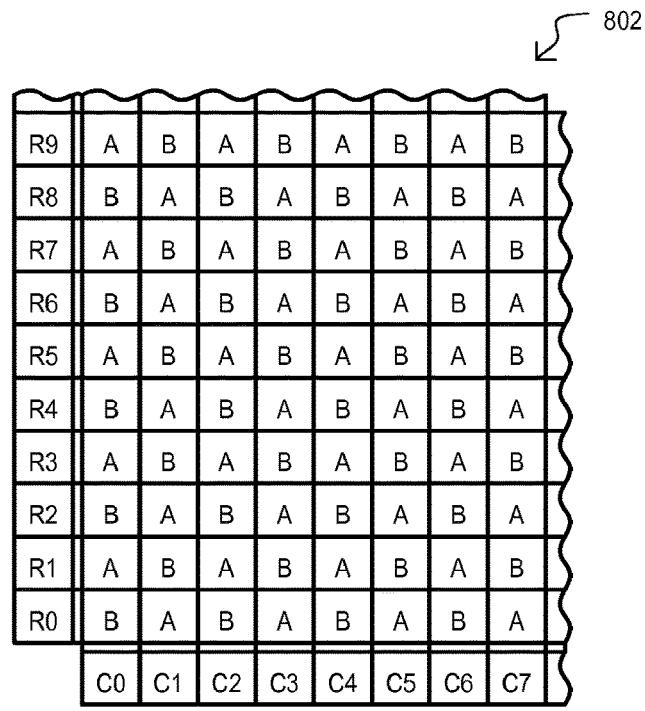
FIGS. 8A and 8B show a touch area and corresponding sense operation according to an embodiment.
Figure 8B:
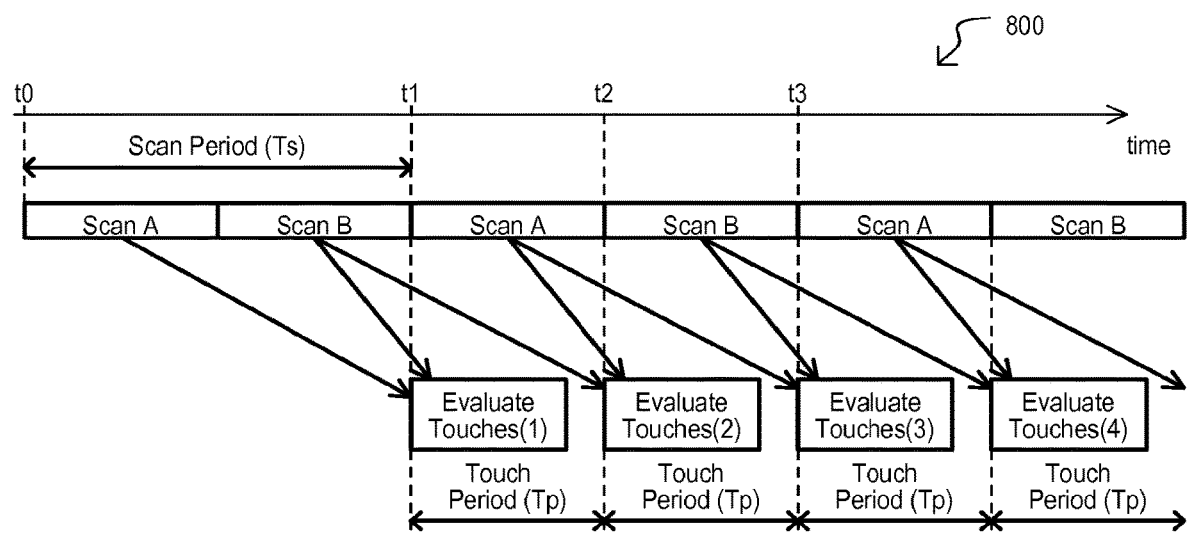

Referring now to FIGS. 8A and 8B, a sensing operation according to a further embodiment is shown in the diagrams. FIG. 8A is a top plan view of a touch area, which in one example, may be another implementation of that shown in FIG. 5 or 6. FIG. 8B shows actions of the sensing operation over time.

Referring to FIG. 8A, a touch area 802, like that shown in FIG. 7A, may be conceptualized as including discrete sensed locations corresponding to rows (R0 to R9) and columns (C0 to C7). However, sensed locations may be logically arranged into "checkerboard" patterns, one including locations shown as "A", and another including locations shown as "B". Such checkerboard patterns (A/B) may be conceptualized as being complementary to one another, as the two patterns may cover different sense locations for a given touch area.

Referring to FIG. 8B, a sensing operation according to another embodiment is shown in a diagram and designated by the general reference character 800. A sense operation 800 may utilize a touch area 802 like that of FIG. 8A.

FIG. 8B shows actions that may be executed by a method and/or device over time, and may be one particular implementation of the embodiment shown in FIG. 1.

An operation 800 may alternately sense different checkerboard patterns of a touch area. Accordingly, as in previous embodiments, data for an entire touch area may be acquired in a scan period (Ts) as shown in FIG. 8B.

In the particular embodiment of FIG. 8B, at about time t0, sense data for one checkerboard pattern (in this particular example, locations "A") may be acquired, followed by sense data for a remaining portion (in this particular example, locations "B").

At about time t1, sense data for an entire touch area may be acquired, and a first evaluation operation may occur, based on sense data for A and B locations acquired between about time t0 and t1. In addition, at this time, a next acquisition of sense data may begin, with checkerboard locations "A" being scanned again.

At about time t2, new sense data for checkerboard pattern A may be acquired, and a next sequential evaluation operation may occur based on the newly acquired checkerboard pattern A location data, and previously acquired data for checkerboard pattern B.

Sense operations may continue as shown in FIG. 8B, evaluating for touches after each portion (A or B checkerboard patterns) of sense data is acquired.

In applications in which touch occurrences may be generally random over a touch area, a checkerboard pattern arrangement like that of FIGS. 8A and 8B may maximize the likelihood that new touch occurrences are captured for processing as fast as possible. As but one example, if a touch area were divided into "Q" contiguous different sections (as opposed to a checkerboard pattern), and each section was newly scanned in a touch period, if an initial touch fell outside the newly scanned section, it would not be detected in the touch period. In contrast, a checkerboard pattern may detect touches at substantially any location of a touch area (assuming resolution of checkerboard is sufficient for the touch type).

In this way, scan operations may include separately accessing discrete locations of a touch area divided into checkerboard sense positions.

While embodiments may include scanning an entire touch surface as described in the above embodiments, alternate embodiments may include an initial scan of an entire surface followed by one or more local scans of smaller areas. Embodiments showing such methods and operations are shown in FIGS. 9 and 10.

Figure 9:
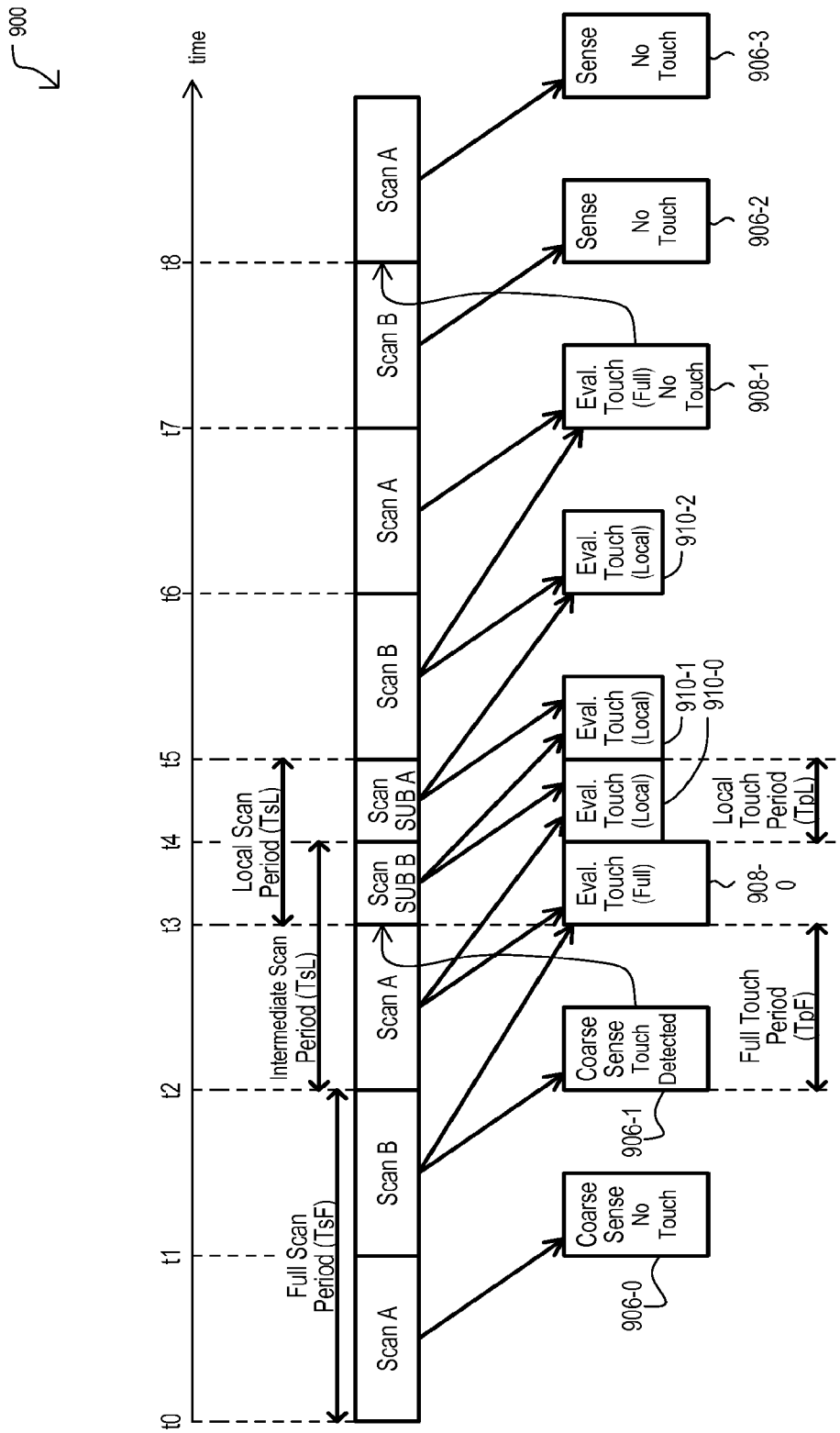
FIG. 9 is a diagram showing a sense operation according to a further embodiment.
Figure 10:
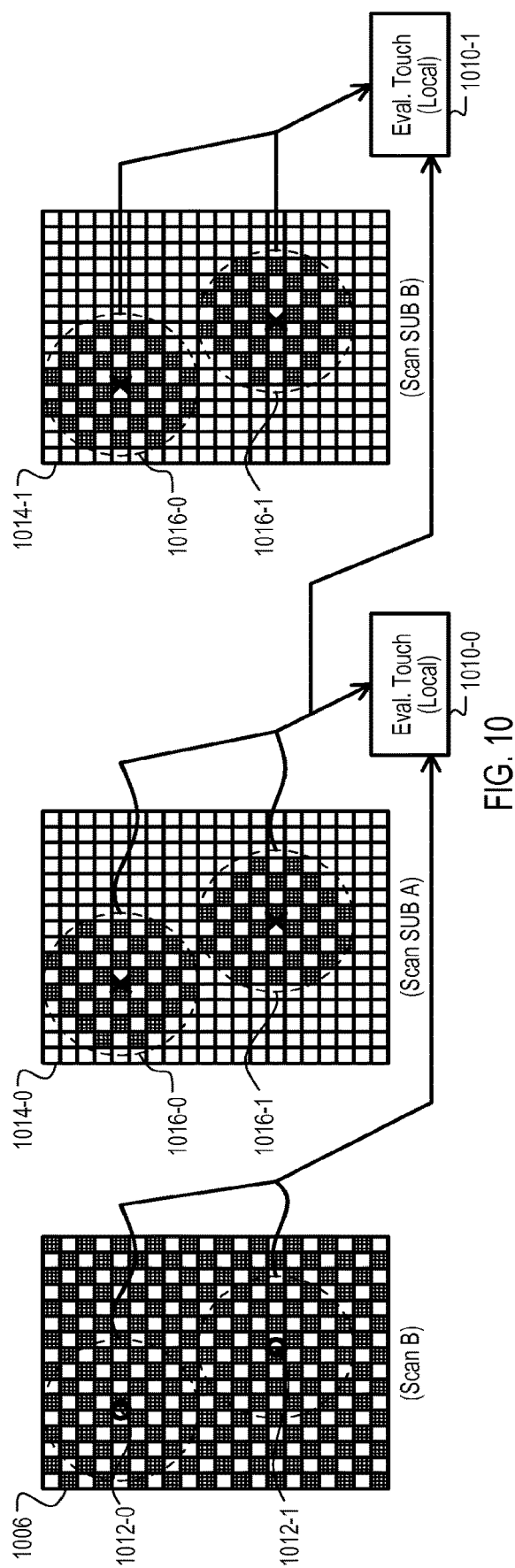
FIG. 10 is a series of plan views showing a sense operation according to a particular embodiment.

Referring to FIG. 9, an example of a sensing operation according to a further embodiment is shown in a diagram and designated by the general reference character 900. FIG. 9 shows actions executed by a method and/or device over time, and may be one particular implementation of the embodiment shown in FIGS. 1 and/or 8A/B.

An operation 900 may initially acquire sense data for a "coarse" distribution of locations. Such coarse sense data may be analyzed for initial touch presence at coarse locations. If presence of initial touch is detected by such coarse sense at one or more locations, an operation 900 may acquire sense data for smaller local touch areas based on upon such initial touch locations. Sense data for such smaller local touch areas may be acquired with "denser" sense locations than the initial coarse locations.

In the particular example of FIG. 9, touch sensing is based on checkerboard patterns. However, other embodiments may utilize any of the other various sense patterns shown herein, or similar equivalents.

Referring to FIG. 9, at about time t0 "coarse" sense data for one portion (in this particular example checkerboard A) may be acquired.

At about time t1, based on the coarse sense data (checkerboard A), an entire touch region may be analyzed for initial touch locations at evaluation 906-0. In FIG. 9, such an evaluation detects no touches. Also at time t1, an operation 900 may start another coarse scan of an entire touch region. In the particular embodiment shown, an operation 900 may scan different coarse locations (checkerboard B).

At about time t2, based on the coarse sense data (checkerboard B), an entire touch region may once again be analyzed for initial touch locations at evaluation 906-1. In FIG. 9, such an evaluation detects one or more touches. Also at time t2, an operation 900 may start another coarse scan of an entire touch region. In the particular embodiment shown, an operation 900 may switch back to coarse locations of checkerboard A.

At about time t3, in response to an initial touch detection (e.g., initial touch evaluation 906-1), an operation 900 may switch to localized sensing based on such initial touch locations. As a result, sense data for a sub-set of checkerboard B (SUB_B) corresponding to the detected initial touch locations may be acquired. Optionally, an operation may make a full touch sense evaluation 908-0 based on newly acquired checkerboard A data scanned between times t2 and t3, as well as previously acquired checkerboard B data, scanned between times t1 and t2.

At about time t4, a localized sensing operation may continue. In addition, acquisition of sense data for a sub-set of checkerboard A (SUB_A) corresponding to local touch location(s) may start. At about this time, a local evaluation of touch data 910-0 may be performed based on newly acquired local data SUB_B as well as previously acquired checkerboard "A" data (scanned between times t2 and t3). It is noted that because such an operation utilizes data from both checkerboard A and checkerboard B positions, such an evaluation is based on closer spaced (i.e., denser) sense locations than an initial touch location analysis (e.g., 906-1), which may be based on one checkerboard pattern (e.g., a coarser set of sense locations).

At about time t5, a localized sensing operation may conclude. Acquisition of sense data may switch back to an entire checkerboard pattern, which in this example is checkerboard B. Also at about this time, a second local evaluation of touch data 910-1 may be performed based on newly acquired local data SUB_A as well as previously acquired local data SUB_B. Again, because such an operation utilizes data from both checkerboard A and checkerboard B positions, such an evaluation is based on closer spaced sense locations than an initial touch "coarse" location analysis (e.g., 906-1).

At about time t6, sensing may continue scanning with a full checkerboard pattern (in this case checkerboard A). Also at about this time, a third local evaluation of touch data 910-2 may be performed based on newly acquired "coarse" locations for an entire touch area (in this case checkerboard A) as well as previously acquired local data SUB_A. Like local evaluations 910-0 and 910-1, this evaluation is based on more closely spaced sense locations than an initial touch location analysis (e.g., 906-1).

At about time t7, in the particular embodiment of FIG. 9, an operation may make a full touch sense evaluation 908-1 based on newly acquired checkerboard A data scanned between times t6 and t7, as well as previously acquired checkerboard B data, scanned between times t5 and t6. In the embodiment shown, such a sense operation indicates no touches are detected.

At about time t8, in response to no touches being detected, an operation 900 may continue with coarse sensing with alternating checkerboard patterns until a touch is detected.

In this way, touch sensing operations may have an initial coarse sensing of an entire touch region to determine initial touch locations, followed by local touch sensing at smaller touch areas. Local touch sensing may utilize newly acquired sense data for a portion of the local touch area(s) combined with previously acquired sense data for remaining portion(s) of the touch area(s).

FIG. 10 shows one particular embodiment of a touch sensing operation utilizing an initial coarse scan followed by local area scans.

FIG. 10 shows an initial "coarse" full scan 1006 for a "checkerboard B" pattern. Such an initial scan has been evaluated to determine two initial touch locations, shown by circles (1012-0 and 1012-1). Such initial touch locations may be identified by values at particular sense locations (e.g., intersections), or may derive touch location(s) based on a calculation (e.g., centroid).

Referring still to FIG. 10, in response to the identification of initial touch locations (1012-0 and 1012-1), a local scan 1014-0 may be performed on reduced size touch areas based on the initial touch locations. In the particular embodiment shown, such reduced touch areas may be checkerboard pattern "A" locations within radii (1016-0 and 1016-1) of each initial touch location. Such local touch data may be combined with corresponding checkerboard pattern B data (within radii 1016-0 and 1016-1), previously acquired in full scan 1006, in a local touch evaluation operation 1010-0. Thus these combined coarse and reduced scans may provide measured locations suitable for calculating the actual centroids of touch located within radii defined areas 1016-0 and 1016-1.

A second local scan 1014-1 may follow, also performed on reduced size touch areas based on the initial touch locations. However, this second scan may include checkerboard pattern B locations within radii (1016-0 and 1016-1). Such local touch data may be combined with corresponding local checkerboard pattern A data within radii 1016-0 and 1016-1, previously acquired, in a second local touch evaluation operation 1010-1.

In this way, checkerboard pattern data may be used to initially detect a touch location, and subsequent evaluation operations may locally evaluate for touches in smaller regions.

Figure 11:
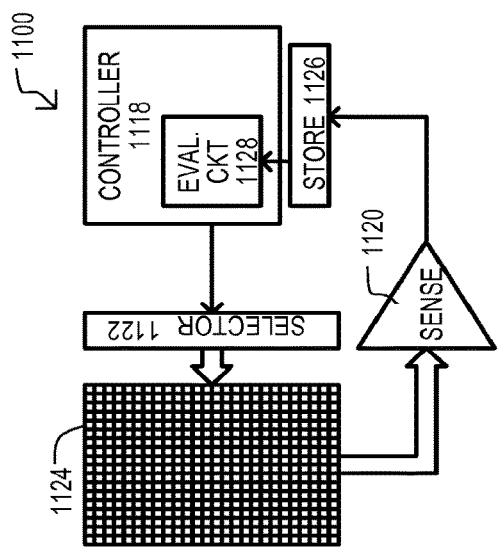
FIG. 11 is a block schematic diagram of a touch evaluation system according to an embodiment.

Referring now to FIG. 11, a touch evaluation system according to one particular embodiment is shown in a block schematic diagram and designated by the general reference character 1100. A system 1100 may include a controller circuit 1118, a sense circuit 1120, a selector circuit 1122, a touch region 1124, and a storage circuit 1126. A controller circuit 1118 may perform sense and touch evaluations as described in operation and method embodiments shown herein, and equivalents. In one particular embodiment, a controller circuit 1118 may generate control signals for selecting (via selector circuit 1122) particular sense locations within touch region 1124. For example, a controller circuit 1118 may select only portions of a touch region 1124 within the time period of an evaluation cycle. In a similar fashion, a controller circuit 1118 may control sense circuit 1120 in order to generate sense values corresponding to particular locations of touch area 1124. Further, a controller circuit 1118 may access storage circuit 1126 to provide acquired/calculated values utilized in previous evaluation operations to an evaluation circuit 1128.

A sense circuit 1120 may sense locations of a touch region 1124 by generating values reflecting the presence, absence and/or nature of a touch event. In one particular example, a sense circuit 1120 may sense a capacitance of sense lines/positions within a touch region. More particularly, a sense circuit 1120 may provide sensing of mutual- and/or self-capacitance values.

A selector circuit 1122 may select particular locations of a touch region 1124 for sensing operations. In some embodiments, a selector circuit 1122 may select rows, columns, and/or both based on selection signals generated from controller circuit 1118. In a particular embodiment, a selector circuit 1122 may connect capacitance sensors within a touch region to a sense node that may be charged/discharge by a sense circuit 1120 to thereby determine a capacitance of a selected location of a touch region. Further, selector circuit 1122 may provide both full scans of a touch region by selection of all or a portion of sense locations that may cover substantially all of a touch region 1124, or may provide local scans of one or more local touch areas by selection of only a portion of the touch region 1124.

A storage circuit 1126 may store values associated with a touch evaluation. Such values may include sense values generated by sense circuit 1120 and/or initial calculation values (e.g., row based centroid and/or column based centroid). A storage circuit 1126 may enable a portion of the values from one evaluation operation to be re-used in a subsequent evaluation. Note that the referenced stored value may be scaled, offset, corrected, or otherwise mathematically manipulated forms of the actual measured sense values.

In the embodiment of FIG. 11, a controller circuit 1118 may include an evaluation circuit 1128 that may generate touch results based on sense values generated by sense circuit 1120. In one embodiment, an evaluation circuit 1128 may include arithmetic logic circuits. In a particular embodiment, an evaluation circuit 1128 may include a processor circuit that executes instructions for the various operations/methods described herein, or equivalents.

In this way, a touch evaluation system may include an evaluation circuit that may re-use partial touch sense results with newly acquired touch sense results to generate a final touch result.

Figure 12:
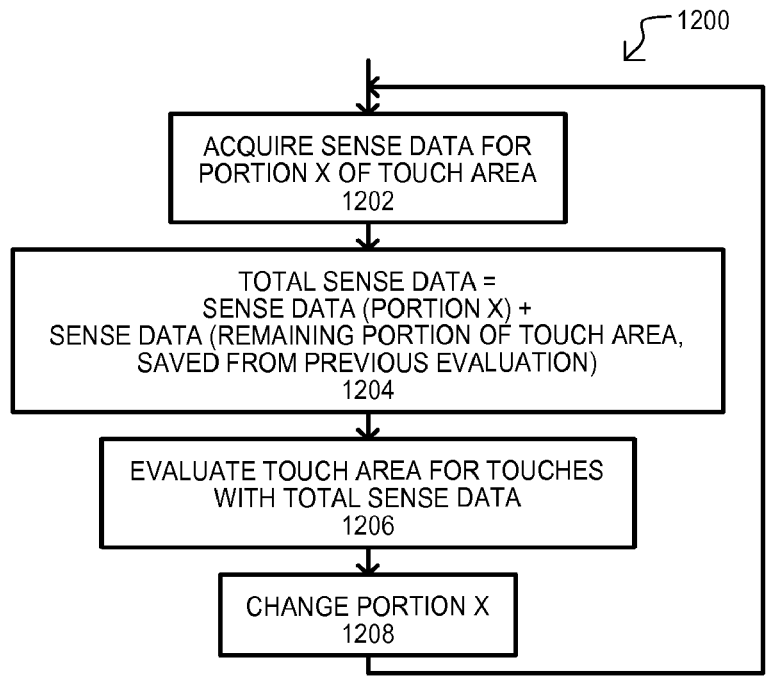
FIG. 12 is a flow diagram of a method according to a first embodiment.

Referring now to FIG. 12, a method according to an embodiment is shown in a flow diagram, and designated by the general reference character 1200. A method 1200 may include acquiring sense data for a portion (PORTION X) of a touch area (1202). Such an action may include acquiring sense data for an entire touch surface (i.e., touch area is entire touch region) or may include acquiring sense data for a smaller part of a larger touch region.

A method 1200 may also include establishing total sense data used to evaluate a touch area. In FIG. 12, such an action may include combining sense data sensed in block 1202 (PORTION X) with sense data for a remaining portion of the touch area, saved from a previous evaluation (1204). Such an action may include combining sense data values for different portions, or combining initial generated results (e.g., calculations) for PORTION X, with generated result for a remaining portion.

A method 1200 may further include evaluating the touch area for touches with the total sense data (1206). Such an action may generate determined touch locations for use by an application program.

A method 1200 may then change a portion for which a next acquisition operation is to take place (1208). Such an action may include switching to sense values to another, different portion of a touch area, or generating a value (e.g., calculation) for some other portion of a touch area. It is understood that switching to a different portion X may include various actions, including switching from rows to columns (or vice versa), switching between checkerboard patterns, switching between even and odd rows or columns, switching between quadrants (or some other subdivision of a touch area), or any other subdivision of the touch area. This may include switching through minimum sized sense locations (e.g., one row or column in a self-sensing capacitance touch region, one intersection in a mutual self-sensing capacitance touch region).

In this way, a method may acquire sense data for a portion of a touch area, and then evaluate for touches using such acquired sense data as well as sense data for a remaining portion of the touch area saved from a previous evaluation.

Figure 13:
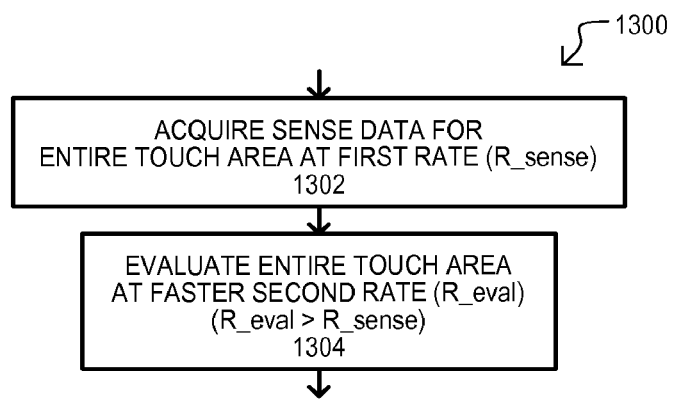
FIG. 13 is a flow diagram of a method according to another embodiment.

Referring now to FIG. 13, a method according to another embodiment is shown in a flow diagram and designated by the general reference character 1300. A method 1300 may include acquiring sense data for an entire touch area at a first rate (R_sense) 1302. Such an action may include repeatedly scanning two or more sets of locations, to acquire a full set of sense data for a touch area.

A method 1300 may further include evaluating an entire touch area at a faster second rate (R_eval) than the area scan rate (R_eval>R_sense) 1304. Such an action may provide touch detection updates for a touch area at a faster rate than a scan rate for the touch area. This is in contrast to an arrangement like that shown in FIG. 3, in which an evaluation rate may be the same as, or no faster than, a rate at which a scan area is sensed. In one particular embodiment, evaluation at such a faster rate may be achieved by evaluating newly acquired results for a portion of the touch area along with previously acquired results for a remaining portion of the touch area.

In this way, a method may include evaluating a touch area for touches at a faster rate than acquiring sense data for the entire touch area.

Figure 14:
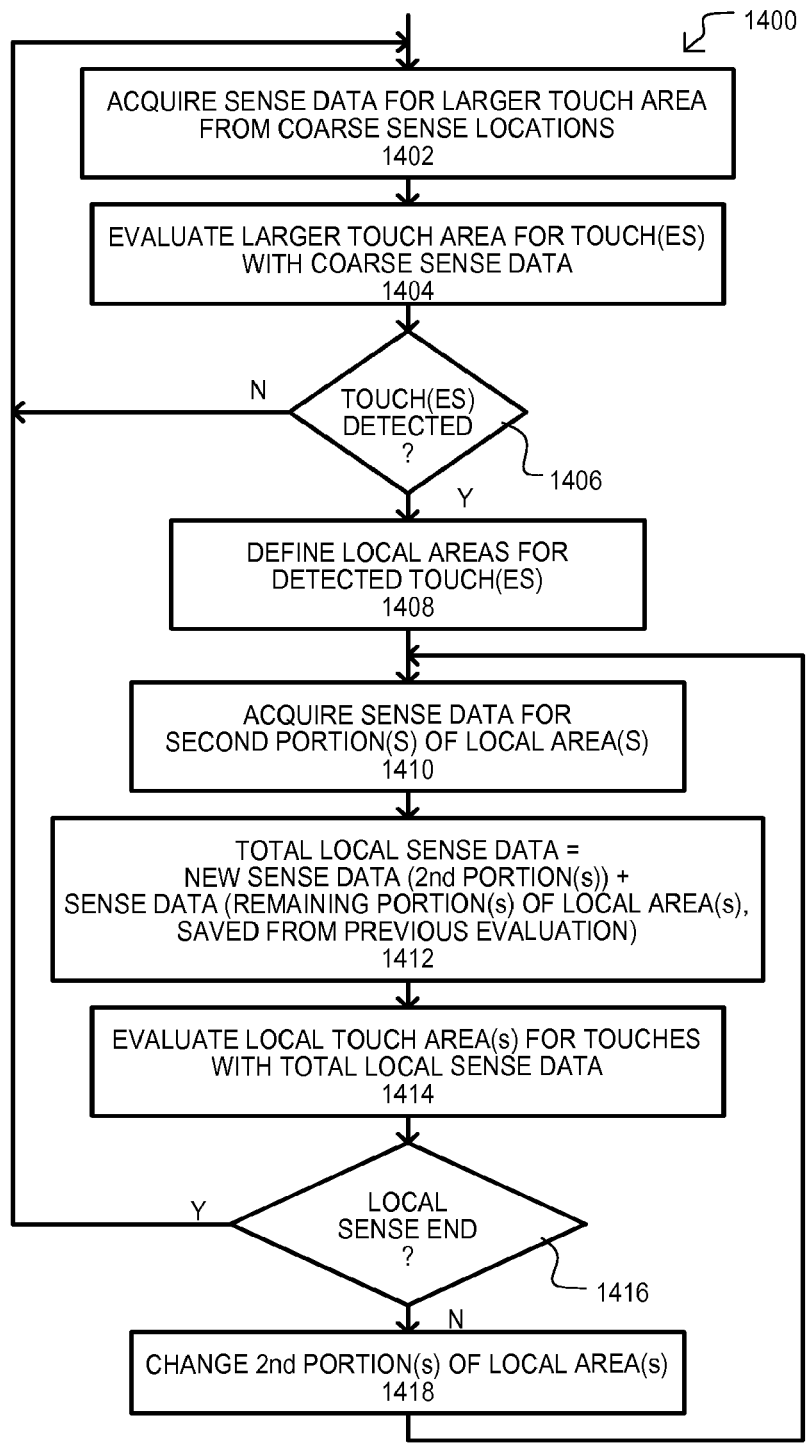
FIG. 14 is a flow diagram of a further embodiment.

Referring now to FIG. 14, another method according to an embodiment is shown in a flow diagram and designated by the general reference character 1400. A method 1400 may include acquiring sense data for a larger touch area from coarse sense locations 1402. Such an action may include acquiring sense data for the larger touch area utilizing less than all possible sense locations for the touch area. In some embodiments, actions in box 1402 may include switching between different coarse sensing locations on different occasions/iterations. In a particular embodiment, such an action may acquire sense data from a "checkerboard" pattern.

The method 1400 may evaluate the larger touch area for touches with coarse sense data 1404. Such an action may evaluate acquired sense data to determine if and/or approximately where one or more touches have occurred on the larger touch area. In particular embodiments, box 1404 may include self and/or mutual capacitance sensing.

If an evaluation from box 1404 determines that touches are not detected (N from box 1406), method 1400 may return to box 1402 and once again acquire coarse sense data. In some embodiments, such an action may include switching from one coarse checkerboard pattern to another.

If an evaluation from box 1404 determines that touches are detected (Y from box 1406), the method 1400 may define local areas for such detected touch(es) 1408. Such an action may establish smaller sense regions based on detected touches. In one particular embodiment, a radius around each detected touch may be derived.

Sense data may be acquired for second portions of local area(s) 1410. Such an action may include acquiring sense data from fewer than all possible sense locations for the local area. In one particular embodiment, such an action may include scanning based on a second checkerboard pattern only in the local area(s) identified in step 1408.

The method 1400 may then establish a total local sense data as including a portion of local sense data, as well as a remaining portion of sense data saved from a previous evaluation (1412). Such an action may include recalling values generated in a previous sensing and evaluation operation, and combining such values with new values generated from the sensing operation of box 1410. It is noted that such total local sense data may represent sense data for closer spaced sense locations within the local area as compared to spacings utilized in the coarse sensing of box 1402. In a particular embodiment, new sense data for local area(s) may be for locations corresponding to one checkerboard pattern (within such local areas), and saved sense data may be for a complementary checkerboard pattern (within such local areas).

Method 1400 may evaluate local touch areas with the total local sense data 1414. Such an action may include generating touch data results as inputs for a corresponding application.

Method 1400 may further determine if local area sensing is ending 1416. Such an action may continue or end a local sensing operation based on predetermined criteria. Such criteria may be static (e.g., all possible local areas locations have been sensed, a given time period has passed, a given number of iterations has taken place), or may be dynamic (e.g., no touches detected in a local area, application ends local sensing). Such criteria for ending local sensing is not intended to be limiting. Other embodiments may include other criteria.

If local area sensing is not ended (N from 1416), method 1400 may change a second portion of local area(s) 1418. Such an action may alter portions of local areas acquired for new sense data in box 1410. In one particular embodiment, such an action may switch from one checkerboard pattern to another, or may include a complete coarse scan of an alternate checkerboard area.

If local area sensing is ended (Y from 1416), method 1400 may return to acquiring "coarse" sense data (box 1402).

In this way, a method may acquire coarse sense data to determine local touch areas of a larger touch area, and then acquire portions of sense data for such local touch areas. Newly acquired sense results for a portion of the local sense areas may be combined with previously acquired sense results from remaining portions of the local sense areas to evaluate for touch locations within the local touch areas.

As noted previously, while some embodiments may pipeline sensing operations for different portions of a touch area, other embodiments may pipeline partial calculations from such sense data. One particular embodiment showing such an arrangement is set forth in FIG. 15.

Figure 15:
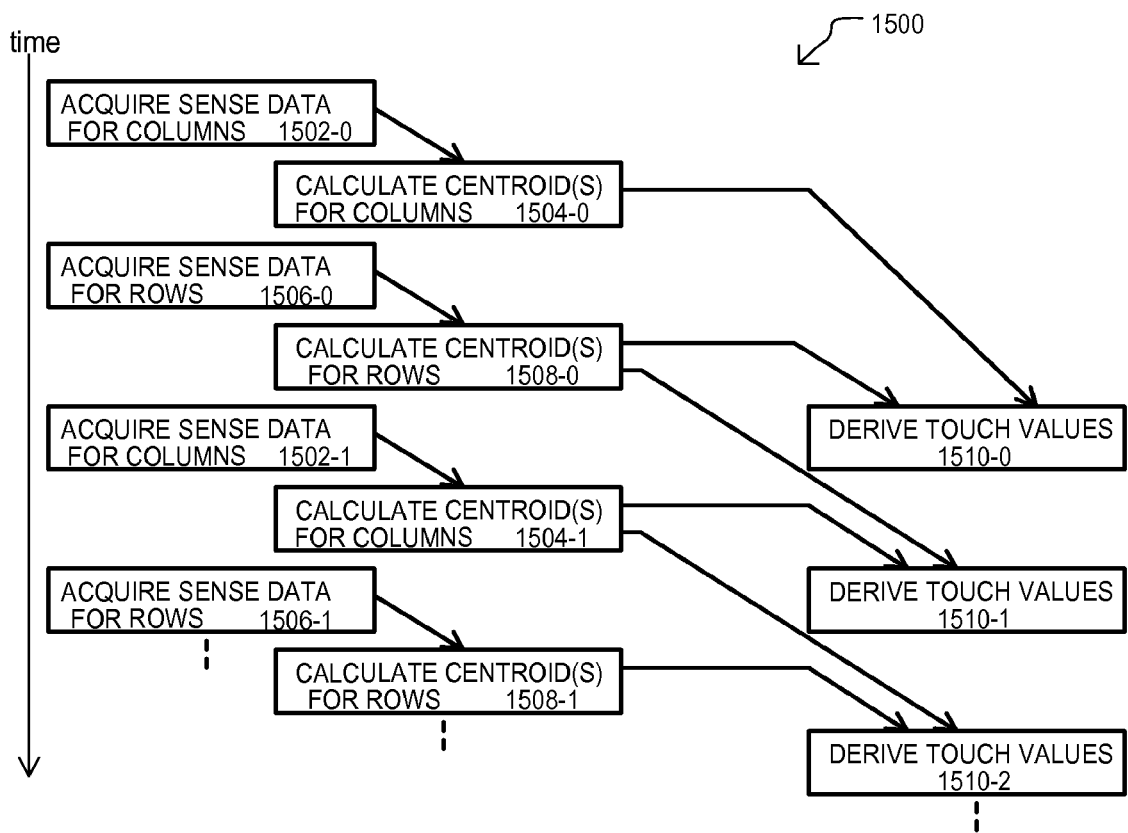
FIG. 15 is a diagram showing an evaluation operation according to another embodiment.

Referring to FIG. 15, a touch evaluation operation is shown in a diagram and designated by the general reference character 1500. FIG. 15 shows actions that may occur over time. It is understood that while FIG. 15 shows the calculations of row and column centroids, other embodiments may include different partial touch result calculations that are combined to derive final touch values.

An operation 1500 may include acquiring a first portion of sense data 1502-0. In the embodiment shown, this may include acquiring sense data for columns of a touch area. In an even more particular embodiment such an operation may include acquiring self-capacitance values for columns of a capacitance sense array.

In response to a first portion of sense data, an operation 1500 may perform an initial calculation based on such sense data 1504-0. In the embodiment shown, this may include calculating the centroid(s) for touch location based on column values.

An operation 1500 may further include acquiring a second portion of sense data 1506-0. In the embodiment shown, this may include acquiring sense data for rows of a touch area. In an even more particular embodiment such an operation may include acquiring self-capacitance values for rows of a capacitance sense array.

In response to a second portion of sense data, an operation 1500 may perform an initial calculation based on such sense data 1508-0. In the embodiment shown, this may include calculating the centroid(s) for touch location based on row values.

In response to initial calculations from boxes 1504-0 and 1508-0, touch values may be derived 1510-0. In a particular embodiment, such an action may include determining touch locations based on both a column axis centroid and a row axis centroid.

An operation 1500 may then once again acquire a first portion of sense data 1502-1, and perform an initial calculation based on such sense data 1504-1.

In response to new initial calculations from box 1504-1, and operation 1500 may combine such values with previously calculated values from another portion (1508-0). In the particular embodiment shown, a newly calculated column centroid value (i.e., from box 1504-1) may be combined with a previously calculated row centroid value (i.e., from box 1508-0) to derive new touch values 1510-1.

An operation 1500 may continue in the same fashion as shown in FIG. 15, utilizing previously calculated values with newly calculated values to generate touch result values.

In this way, touch sensing operations may utilize calculations from newly acquired sense data combined with previously generated calculations to generate touch data for a touch area.

It should be appreciated that in the foregoing description of exemplary embodiments. Various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A touch sensing device, comprising:
an evaluation circuit configured to:
generate a first set of touch location results for a touch area based on first sense data representing first electrical signals measured from a first subset of a plurality of sensors of the touch area, and second sense data representing second electrical signals measured from a second subset of the plurality of sensors, wherein the second subset includes sensors excluded from the first subset, and
generate a second set of touch location results for the touch area by performing an evaluation operation on the second sense data and third sense data representing third electrical signals measured from the first subset acquired after acquiring of the first sense data; and
a storage circuit configured to retain at least the second sense data, wherein the evaluation circuit is configured to recall the second sense data from the storage circuit to generate the second set of touch location results.

2. The touch sensing device of claim 1, wherein the evaluation circuit is configured to generate the first sense data by analyzing capacitance values for the first subset of the plurality of sensors, and to generate the second sense data by analyzing capacitance values for the second subset of the plurality of sensors.

3. The touch sensing device of claim 1, further including a selector circuit configured to select initial sense locations for a total touch region prior to the generation of touch results and to select evaluation sense locations for the generation of touch results, the evaluation sense locations having a higher density than the initial sense locations, and the touch area being a smaller portion of the total touch region.

4. The touch sensing device of claim 3, wherein the initial sense locations correspond to a checkerboard pattern of the total touch region and the evaluation sense locations include: a portion of the checkerboard pattern, and a corresponding portion of a complementary checkerboard pattern.

5. The touch sensing device of claim 1, further including a touch panel comprising the plurality of sensors arranged into sensor rows and sensor columns, wherein the first subset of the plurality of sensors are arranged in the sensor rows and the second subset of the plurality of sensors are arranged in the sensor columns.

6. The touch sensing device of claim 1, further including a touch panel comprising row sensors and column sensors, wherein each of the column sensors intersects each of the row sensors to form a plurality of intersections, wherein the plurality of intersections includes a first set of intersections and a second set of intersections, wherein the first sense data is generated from the first set of intersections, and the second sense data is generated from the second set of intersections, wherein the second set of intersections is different from the first set of intersections.

7. A system comprising:
a touch panel comprising a plurality of sensors;
an evaluation circuit configured to generate a first set of touch location results for a touch area based on first sense data representing first electrical signals measured from a first subset of the plurality of sensors of the touch area, and second sense data representing second electrical signals measured from a second subset of the plurality of sensors, wherein the second subset includes sensors excluded from the first subset, and generate a second set of touch location results for the touch area by performing an evaluation operation on the second sense data and third sense data representing third electrical signals measured from the first subset acquired after acquiring of the first sense data; and
a storage circuit configured to retain at least the second sense data, wherein the evaluation circuit is configured to recall the second sense data from the storage circuit to generate the second set of touch location results.

8. The system of claim 7, wherein the plurality of sensors are arranged into sensor rows and sensor columns, wherein the first subset of the plurality of sensors are arranged in the sensor rows and the second subset of the plurality of sensors are arranged in the sensor columns.

9. The system of claim 7, wherein the touch panel comprises row sensors and column sensors, wherein each of the column sensors intersects each of the row sensors to form a plurality of intersections, wherein the plurality of intersections includes a first set of intersections and a second set of intersections, wherein the first sense data is generated from the first set of intersections, and the second sense data is generated from the second set of intersections, wherein the second set of intersections is different from the first set of intersections.

10. The system of claim 7, wherein the evaluation circuit is configured to generate the first sense data by analyzing capacitance values for the first subset of the plurality of sensors and to generate the second sense data by analyzing capacitance values for the second subset of the plurality of sensors.

11. The system of claim 7, further comprising a selector circuit configured to select initial sense locations for a total touch region prior to the generation of touch results and to select evaluation sense locations for the generation of touch results, wherein the selected evaluation sense locations have a higher density than the selected initial sense locations, and wherein the touch area is a smaller portion of the total touch region.

12. The system of claim 11, wherein the initial sense locations correspond to a checkerboard pattern of the total touch region; and the evaluation sense locations include a portion of the checkerboard pattern, and a corresponding portion of a complementary checkerboard pattern.

* * * * *